United States Patent [19]

Rooks

[11] 3,750,177

[45] July 31, 1973

[54] INSTRUMENT LANDING SYSTEM RECEIVER MONITOR

[75] Inventor: Howard B. Rooks, Marion, Iowa

[73] Assignee: Collins Radio Company, Cedar Rapids, Iowa

[22] Filed: May 18, 1971

[21] Appl. No.: 144,502

[52] U.S. Cl. .............. 343/108 R, 325/363, 343/109
[51] Int. Cl. ............................................. G01s 1/08
[58] Field of Search ....................... 343/109, 108 R; 325/363

[56] References Cited
UNITED STATES PATENTS

| | | | |
|---|---|---|---|
| 3,323,125 | 5/1967 | Lunn et al. .......................... | 343/109 |
| 3,389,392 | 6/1968 | Stauffer et al. ................. | 343/108 R |

Primary Examiner—Benjamin A. Borchelt
Assistant Examiner—Richard E. Berger
Attorney—Richard W. Anderson and Robert J. Crawford

[57] ABSTRACT

A phase-amplitude detection system employing a tonal tracer signal imposed on the received ILS carrier signal provides warning as concerns receiver malfunction ahead of the output tone filter rectifiers. Means for comparing tracer signal component, as extracted at selected points within the receiver, with the tracer signal per se annunciates defects in the receiver processed tracer signal (which by necessity must also occur to the desired signal). The integrity of the guidance signal output is preserved by employing the receiver tone output filter as a discriminator in a phase locked loop controlling the frequency and phase of the tracer signal.

9 Claims, 3 Drawing Figures

INVENTOR
HOWARD B. ROOKS
BY R. W. Anderson
AGENT

INSTRUMENT LANDING SYSTEM RECEIVER MONITOR

This invention relates generally to instrument landing system (ILS) receivers and more particularly to an improved failure monitor system for such receivers.

ILS systems are well known in the art and are utilized to provide a pilot with a visual indication of his position relative to a prescribed approach path to a runway. A ground transmitting system generates a directed transmission of carrier signals respectively modulated by 90 Hz and 150 Hz tones. The transmission pattern employed defines a path in space upon which the depths of modulation of the respective audio tones are equal. The ILS receiver includes detection means for recovering the modulated tones and comparing the relative amplitudes of the recovered tones to provide guidance information. When the relative amplitudes of the demodulated tones are equal, the aircraft is on the defined path; and predominance of one tone over the other provides steering command signals in response to which the pilot may reposition the aircraft such that the amplitudes of the recovered tones are again equal, thus providing guidance to maintain the craft on the predetermined spacial path.

ILS receivers thus employ means to amplitude detect the composite 90 Hz and 150 Hz modulation component on the carrier signal and include filtering means to separate the respective 90 Hz and 150 Hz signals for application to the ILS indicator in opposed sense such that equal amplitudes of the two tones define a net zero deviation signal and predominance of one tone over the other provides respective different polarities of net signal voltages causing appropriate needle reflections on the indicator.

Since the instrument landing system is basically intended to provide guidance for landing approaches under adverse weather conditions, the systems necessarily must provide extreme accuracy and reliability. It is imperative that warning systems of one type or another be employed with the ILS receiver to annunciate that operational failure within the receiving system is occurring and thus the guidance information displayed on the ILS indicator is to be avoided. In presently known ILS receiving systems flag warning means are employed which are responsive to the recovered or demodulated tones to be activated on a tone level basis and thus are instrumental in providing a warning system for failure in the ILS receiver appearing generally after the amplitude detection function in the receiver.

In general, the presently employed flag warning systems present a flag warning when the rectifiers employed to convert the separated tone components from the receiver filter into DC deviation signals fail. In such systems other operational failures occurring in the receiving system in the form of amplitude and/or frequency distortion between the receiving antenna and through the composite 90/150 Hz filter from which the separated tones are recovered go undetected; and thus erroneous guidance information may be provided the pilot without the benefit of warning (as by a flag annunciator) that the guidance information is erroneous.

Accordingly the present invention has as an objective thereof the provision of an improved monitoring system for an instrument landing system receiver by means of which receiver failure other than the output bridge rectifiers employed will provide flag warning.

The present invention is featured in the provision of a tonal tracer signal imposed on the received carrier signal together with means for comparing the tracer signal components, as extracted at selected points within the receiver, with the tracer signal source per se, such that defects detected in the receiver processed tracer signal (which by necessity must also occur to the desired signal) are detected and utilized to indicate malfunction of the radio.

The present invention is further featured in the provision of a phase-amplitude detection system to monitor receiver function and a novel employment of the receiver 90/150 Hz filter as a discriminator, such that the inclusion of the tracer signal equally effect the amplitude levels of the 90 Hz and 150 Hz tones which carry the guidance information and preserves the integrity of the difference signal which provides guidance indication.

These and other features and objects of the present invention will become apparent upon reading the following description with reference to the accompanying drawing in which.

Figure 1:
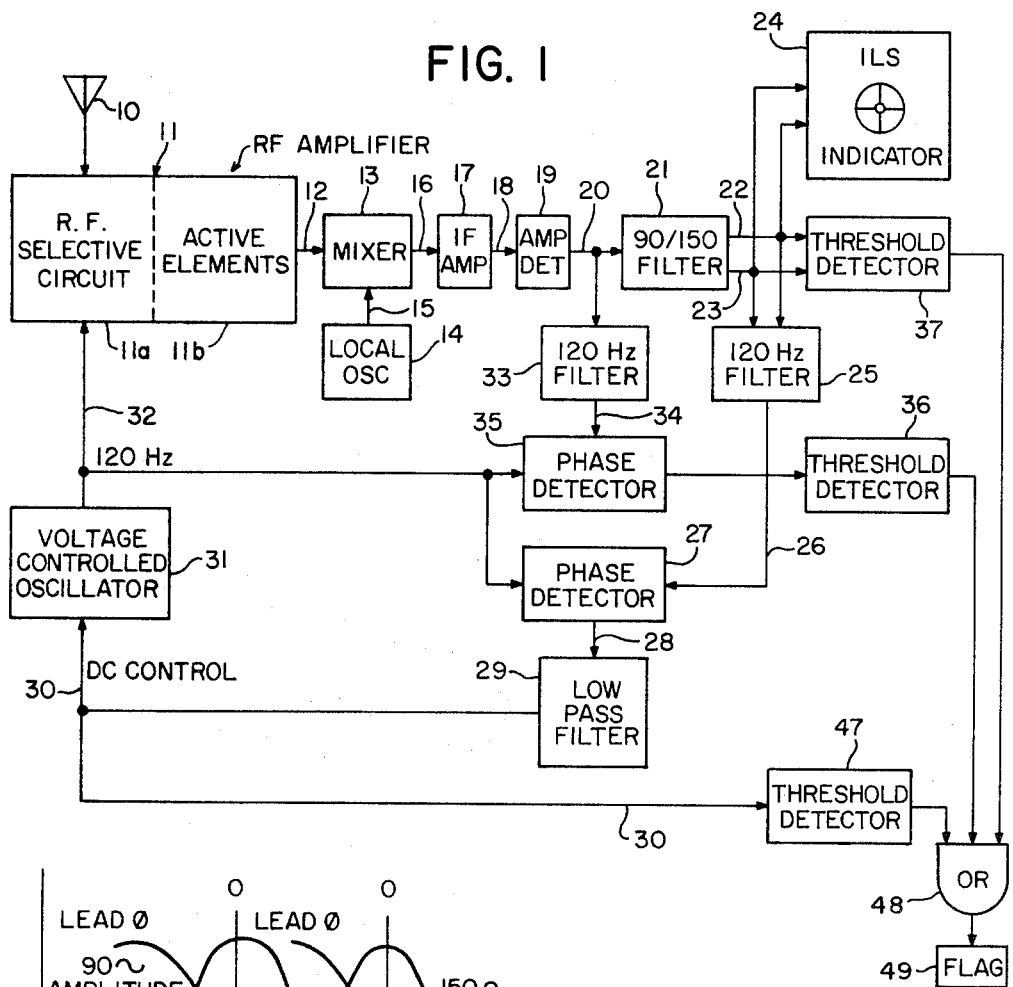
FIG. 1 is a functional block diagram of an ILS receiver including monitoring provisions in accordance with the present invention.

With reference to FIG. 1, the uppermost signal path depicts a conventional ILS receiver including a receiving antenna 10 which applies the tone modulated carrier signal to one or more stages of RF amplification designated by reference numeral 11. The output 12 from the RF amplifier is applied to a mixer 13 which receives an injection input 15 from a local oscillator 14 to develop an intermediate frequency signal 16. The intermediate frequency signal is applied to one or more stages of IF amplification 17 and the IF signal 18 is applied to an amplitude detector 19 which demodulates the applied signal to recover a composite 90 Hz and 150 Hz signal 20. The composite tone demodulation signal 20 is applied to a 90/150 Hz filter 21 which conventionally develops output signals 22 and 23 representing the respective amplitudes of the 90 Hz and 150 Hz modulation components. These signals, for example, might comprise DC signals for application to an ILS indicator 24 which presents a zero indication when the amplitude of the 90 Hz and 150 Hz demodulated tones are equal, and respective polarized deflections in response to the amplitude of one of the 90 Hz and 150 Hz demodulated tones exceeding that of the other. Also conventionally depicted in FIG. 1 is a threshold detector 37 which receives the tone amplitude signals and, in response to a particular deviation signal level, activates a flag 49 to annunciate failure in the conventional output bridge rectifiers associated with the 90/150 Hz filter circuitry.

As above discussed, a flag warning system operating purely on deviation signal level, may permit erroneous deviation signals to be applied to the ILS indicator 24 due to system failures within the receiver prior to the 90/150 Hz filter rectifiers.

In accordance with the present invention a tracer signal frequency midway between the 90 Hz and 150 Hz system tones is employed to monitor other malfunctions which may effect erroneous output signals. Generally, the tracer signal is imposed on the received carrier signal, and means are incorporated to compare the amplitude modulation detected tracer signal components to the tracer signal source per se, such that defects in the detected tracer (which by necessity must also occur to the desired tonal components) are detected and used to indicate malfunction.

The tracer signal is generated by a voltage controlled oscillator 31 which applies a tracer frequency output signal 32 to modulate the received RF carrier signal. This is accomplished, in accordance with the present invention, by utilizing the voltage controlled oscillator output signal 32 to vary the impedance of, for example, the first or second radio frequency selective circuit (designated 11a) ahead of any active elements 11b in the RF amplifier 11 of the receiver. The output 12 of the RF amplifier 11 is thus amplitude modulated not only by the received tonal modulations of 90 Hz and 150 Hz, but, in addition, by the frequency of the voltage controlled oscillator tracer signal 32.

In accordance with the present invention the voltage controlled oscillator operates at a frequency midway between that of the system 90 Hz and 150 Hz tonal modulation components. Thus, the received carrier signal is additionally modulated by 120 Hz from voltage controlled oscillator 31. The output 20 from amplitude detector 19 is applied to a 120 Hz filter 33 from which tracer signal component 34 is applied as a first input to a phase detector 35. The reference input to the phase detector 35 is the tracer output 32 from the voltage controlled oscillator 31. The output from phase detector 35 then comprises a DC signal proportional to the phase discrepancy between the tracer signal component 34 as it appears on the output of filter 33, and the phase of the tracer signal 32 per se.

The output from phase detector 35 might be applied to a further threshold detector 36 the output from which is applied through OR gate 39 to additionally provide flag annunciation in response to receiver failure which causes amplitude or phase changes of the 120 Hz tracer signal. These failures might include, for example, loss of AVC voltage, failure of AVC filter, and loss of biases within the receiver causing amplitude limiting, etc.

The circuitry as thus far described has assumed that the output 32 from voltage controlled oscillator 31 is a 120 Hz signal. For the purpose of the present invention, means are employed to assure that the output 32 from voltage controlled oscillator 31 is controlled at a frequency midway between that of the system 90 Hz and 150 Hz tone modulation components. This further control is necessitated since the tracer signal components appearing at the output of amplitude detector 19 are additionally applied to the composite 90/150 Hz filter 21, and it is imperative, to preserve the integrity of the deviation signals 22 and 23 as applied to the ILS indicator 24, that the tracer signal equally effect the outputs of the 90 Hz and 150 Hz filters employed. For this purpose, the 120 Hz tracer signal 32 from voltage controlled oscillator 31 is employed in a phase-locked loop, utilizing the 90 Hz/150 Hz filter 21 as a discriminator. With reference to FIG. 1, the outputs 22 and 23 from the 90/150 Hz filter 21 are applied to a further 120 Hz filter 25 the output from which comprises tracer frequency signal components which have been coupled through the filter 21. The output 26 from 120 Hz filter 25 is applied as a first input to a further phase detector 27 the output 28 of which is passed through a low pass filter 29. The output from filter 29 is applied as a DC control voltage 30 to voltage controlled oscillator 31. The output 32 from voltage controlled oscillator 31 is applied as the reference signal input to the further phase detector 27. The 90 Hz/150 Hz filter 21, in being inherently phase sensitive, is utilized to control the frequency of the voltage controlled oscillator 31 to hold it at a frequency midway between the 90 Hz and 150 Hz tones such that it will have equal effect on the outputs 22 and 23 from the filter.

Figure 2:
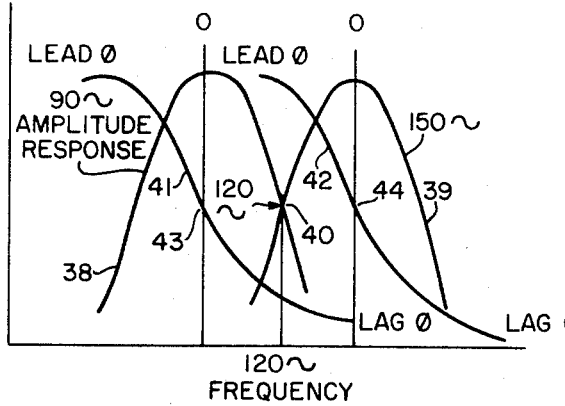
FIG. 2 is a diagrammatic representation of phase and amplitude relationships existing in the embodiment of FIG. 1.
Figure 3:
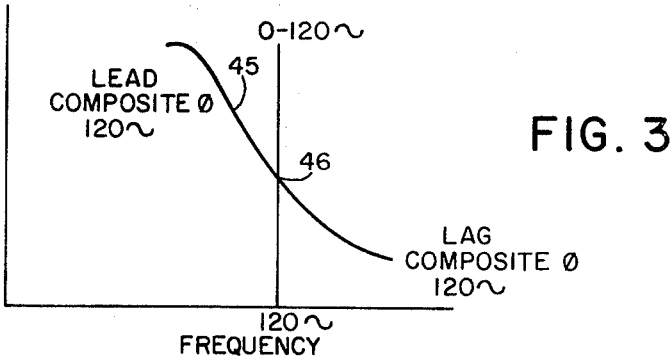
FIG. 3 is a further diagrammatic illustration of phase relationships relating to the embodiment of FIG. 1.

With reference to FiG. 2, the amplitude and phase response of both the 90 Hz and 150 Hz filters is depicted. The phase sensitivity of the filters is illustrated by the leading and lagging phase shifts of the filter output symmetrically disposed about the respective center frequencies of the filters. FIG. 2 further illustrates that midway between the 90 Hz and 150 Hz tones (at the tracer signal frequency of 120 Hz) the amplitudes from each of the 90 Hz and 150 Hz filters are equal. This is indicated by the 90 Hz amplitude response curve 38 equaling the 150 Hz amplitude response at curve 39 at the intersection point 40, the latter occurring at the mid-frequency of 120 Hz. FIG. 3 illustrates the composite phase sensitivity as concerns the 120 Hz tracer signal components from each of the 90 and 150 Hz filters after passing through 120 Hz filter 25. The phase shift characteristic 45 of the 120 Hz tracer signal is seen to lead and lag that of the 120 Hz signal component applied to the filters about the point 46 corresponding to the mid-point between the 90 Hz and 150 Hz tones.

Thus, the output of 120 Hz filter 25 is compared in phase with the phase of the voltage controlled oscillator tracer output 32 and the output 28 from phase detector 27 controls the frequency of voltage controlled oscillator 31, forcing the 120 Hz tracer signal 32 to a frequency that equally effects the output of each of the 90 Hz and 150 Hz filters in the receiver. The DC control voltage 30 from the low pass filter 29 in the phase locked loop may be applied to a further threshold detector 47 the output of which is additionally applied through OR gate 48 to activate flag 49. This effectively sets a limit on the voltage controlled oscillator control voltage to warn if the frequency of the tracer signal output 32 from the voltage controlled oscillator must change excessively to hold the above described center frequency. This excessive frequency change might occur, for example, upon failure of one or the other of the filters in block 21 of the system.

The present invention is thus seen to provide, in an ILS receiver, additional flag warning monitoring provisions which are responsive to amplitude or phase distortions stemming from receiver failures ahead of the output filter as well as failure of the filter per se. These additional monitoring schemes are provided in a manner supplementing that of the deviation level flag annunciation in current use in ILS radios and in a manner retaining validity of the deviation signals as applied to the ILS indicator.

Although this invention has been described with respect to a particular embodiment thereof, it is not to be so limited, as changes might be made therein which fall within the scope of the invention as defined by the appended claims.

I claim:

1. In a radio receiver system of the type separably recovering first and second tonal modulation components on a received carrier signal; said receiver comprising means for amplitude detecting said tonal modulation components, tone bandpass filtering means receiving the output of said means for detecting and producing first and second output signals comprising said demodulated tones, means for rectifying the outputs from said filtering means and applying DC signals respectively proportional to the difference in amplitude of said tonal modulation components to an indicating means; a monitoring means for detecting malfunction in said receiver and annunciating same, said monitoring means comprising a tracer signal source, means for amplitude modulating said received carrier signal by said tracer signal, further bandpass filtering means connected to the output from said tone bandpass filtering means and passing a signal corresponding in frequency to that of said tracer signal, a first phase detector receiving the output of said further bandpass filtering means as a first input thereto, said tracer signal source comprising a second input to said first phase detector, low pass filtering means receiving the output of said first phase detector, means for controlling the frequency of said tracer signal source as a function of the output of said low pass filtering means, and annunciating means being connected to and activated in response to a predetermined threshold output from said low pass filtering means.

2. A receiver system as defined in claim 1 including means for phase locking said tracer signal source to a frequency to which said first and second outputs from said bandpass filtering means are equally responsive.

3. A system as defined in claim 2 wherein said tracer signal source operates at a frequency substantially equal that of the mean of said demodulated tone frequencies.

4. A receiving system as defined in claim 3 wherein said means for modulating comprises means to vary the impedance of a carrier frequency selective circuit preceding any active element in said receiving means.

5. A receiving system as defined in claim 4 further comprising a third bandpass filtering means centered at the frequency of said tracer signal source and receiving the output of said receiver amplitude detector, said third bandpass filtering means output being applied as a first input to a second phase detecting means, said tracer signal source comprising a second input to said second phase detecting means, and said annunciating means being connected to and additionally responsive to a predetermined amplitude threshold of the output from said second phase detecting means.

6. A receiving system as defined in claim 5 wherein said annunciating means is connected to and additionally responsive to a predetermined threshold output from said tone bandpass filtering means.

7. In a radio receiver system of the type separably recovering first and second tonal modulation components on a received carrier; said receiver comprising means for amplitude detecting said tonal modulation components, tone bandpass filtering means receiving the output of said means of detecting and producing first and second output signals comprising said demodulated tones, means for rectifying the outputs from said bandpass filtering means and applying DC signals respectively proportional to the difference in amplitude of said tonal modulation components to an indicating means, and carrier frequency amplifying means receiving said carrier signal and including carrier frequency selective circuitry preceding any active element therein; a monitoring means for detecting malfunction in said receiver and annunciating same, said monitoring means comprising means for further amplitude modulating said received carrier frequency signal by varying the impedance of at least one of said carrier frequency selective circuits in accordance with a source of tracer signal having a predetermined frequency, means for controlling said tracer signal in frequency and phase at a frequency comprising substantially the mean of said first and second tonal modulation component frequencies and in a manner such that said tracer signal frequency component as coupled to said tone bandpass filtering means produces an equal effect upon the tone outputs from said tone bandpass filtering means, further bandpass filtering means centered about said tracer signal frequency receiving the output from said amplitude detecting means, means for phase detecting the output from said further bandpass filtering means with the output from said tracer signal source, and annunciating means responsive to a predetermined threshold output from said first phase detecting means to be activated.

8. A monitoring means as defined in claim 7 wherein said tone bandpass filtering means comprises first and second bandpass filtering means respectively responsive to an individual one of said first and second tonal modulation frequencies, each of said first and second bandpass filtering means exhibiting a predetermined like bandpass characteristic and being phase sensitive, and said means for controlling said tracer signal comprises means for phase locking said tracer signal source to a frequency to which said first and second bandpass filtering means are equally responsive.

9. A receiving system as defined in claim 8 wherein said means for phase locking comprises a still further bandpass filtering means connected to the outputs from said first and second bandpass filtering means and passing a signal the frequency of which is substantially equal that of the mean of said demodulated tone frequencies, a further phase detector receiving the output of said still further bandpass filtering means as a first input thereto, said tracer signal source comprising a second input to said further phase detector, low pass filtering means receiving the output of said further phase detector, and means for controlling the frequency of said tracer signal source as a function of the output from said low pass filtering means; and said annunciating means being connected to and additionally responsive to a predetermined threshold output from said low pass filtering means.

* * * * *